No. 785,817. PATENTED MAR. 28, 1905.
D. MASON.
CONTROLLING APPARATUS FOR MOTOR VEHICLES.
APPLICATION FILED AUG. 25, 1903.
Fig. 1
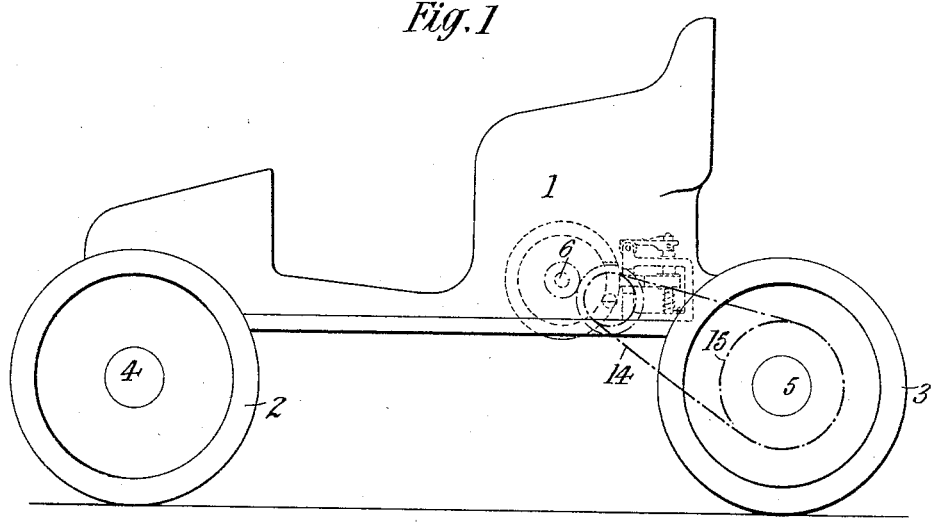
Fig. 2
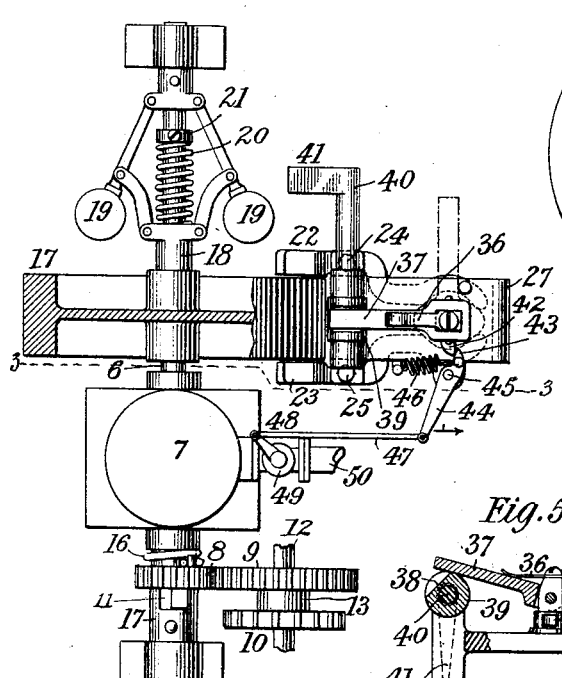
Fig. 3
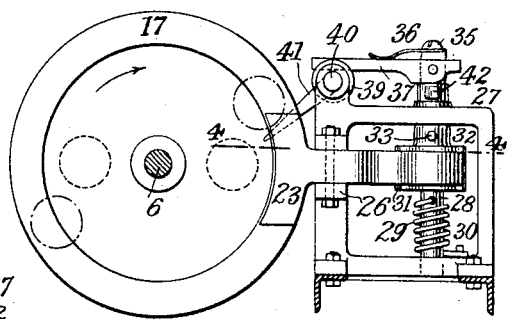
Fig. 4
Fig. 5
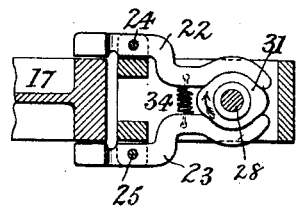
Witnesses:
Raphaël Netter
Wm. H. Capel
Inventor
David Mason
by George H. Stockbridge Att'y.

No. 785,817.  Patented March 28, 1905.

UNITED STATES PATENT OFFICE.

DAVID MASON, OF NEW YORK, N. Y., ASSIGNOR TO JOHN A. WOODS, OF BROOKLYN, NEW YORK.

CONTROLLING APPARATUS FOR MOTOR-VEHICLES.

SPECIFICATION forming part of Letters Patent No. 785,817, dated March 28, 1905.

Application filed August 25, 1903. Serial No. 170,682.

*To all whom it may concern:*

Be it known that I, DAVID MASON, a citizen of the United States, and a resident of New York, in the county of New York and State of New York, have invented certain new and useful Improvements in Controlling Apparatus for Motor-Vehicles, of which the following is a specification.

My invention is concerned with providing means whereby the speed of automobiles or other vehicles can be automatically controlled so that it shall never exceed a certain limit, the device selected being adjustable to meet the different requirements of city or country travel.

As a convenient medium for illustrating the invention, which, as already stated, is applicable to a variety of vehicles, I have selected a common type of automobile and illustrated the invention as applied to the control thereof.

My invention will be clearly understood by reference to the accompanying drawings, in which—

Figure 1 is a side elevation of an automobile or motor vehicle, showing in dotted lines some of the details of my invention applied thereto. Fig. 2 is a plan of my attachment, together with the driving apparatus of the vehicle. Fig. 3 is a vertical section along the line 3 3 in Fig. 2, and Figs. 4 and 5 are detail views.

Referring to the drawings, 1 is the body of a motor-vehicle. 2 and 3 are respectively front and rear wheels for the said vehicle, and 4 and 5 are the front and rear axles thereof. The driving-shaft 6 is located, as is customary in motor-vehicles, under the seat of the vehicle, and in the present instance I have shown a motor 7 for operating the said shaft and the usual gearing 8, 9, and 10, connected with the said shaft. I also show an ordinary clutch mechanism 11 for engaging or disengaging the motor with or from the gearing. The gear-wheels 9 and 10 are mounted upon a shaft 12, and between them is a bearing 13 for a belt 14, running to a disk or friction-wheel 15 on the axle 5. In place of the belt and friction-bearings I might apply a sprocket-chain and coöperating sprocket-wheels.

I usually prefer to provide a spring 16, as shown in Fig. 2, for taking up shock or strain during the operation of starting or stopping. I also mount rigidly on the shaft 6 a brake-wheel 17, which may also act as a fly-wheel. On the same shaft I may mount a governor 18, having the usual governing-balls 19 19 and provided with the usual spring 20 for regulating the throw of the governor-balls.

It will be observed that one end of the spring 20 is connected with an adjustable collar 21, whereby the throw of the governor-balls under a given speed is made subject to regulation.

On opposite sides of the brake-wheel 17 I locate a pair of bent arms 22 and 23, respectively pivoted at 24 and 25 in brackets, one of which is clearly shown at 26 in Fig. 3. These brackets are mounted upon a frame 27, secured under the seat of the motor-vehicle by any suitable means. Through the upper and lower members of the frame 27 extends a vertical shaft 28, which is urged by a spring 29 in a direction indicated by the arrow in Fig. 4. One end of the spring 29 is connected with the shaft 28 and the other with a stud 30 on the frame 27.

The shaft 28 carries near its center a cam 31, formed on a hub 32, which is detachably connected to the shaft by a pin 33.

When the parts are in their normal position, the inner ends of the arms 22 and 23 surround the circular portion of the cam 31 and are held tightly against the same by a spring 34, attached to the two arms, as shown in Fig. 4.

To the upper end of the shaft 28 is secured by a set-screw 35 a spring 36, which bears upon a lever 37, pivoted to the end of the said shaft. The force of the spring 36 serves to urge the lever 37 down upon a notched portion 38 of a sleeve 39 on a shaft 40, journaled in the frame 27. The shaft 40 extends outward alongside the governor, as shown in Fig. 2, and is provided at one end with an extension.

The shaft 28 is held from rotating under the influence of the spring 29 by reason of the engagement of the lever 37 with the notched portion of the sleeve 39. Should the sleeve be turned so as to bring the lever upon a smooth portion of the sleeve, the force of the spring 29 would throw the shaft 28 and carry with it the cam 31, thereby bringing the larger diameter of the cam into engagement with the inner ends of the arms 22 and 23. This would immediately cause a binding of the remote ends of the arms 22 and 23 upon the sides or edges of the brake-wheel 17, thereby causing a braking action upon the driving-shaft 6.

The described release of the lever 37 from the notch 38 does not take place so long as the vehicle is traveling at the normal rate of speed, when the throw of the governor-balls is insufficient to strike the extension 41. When, however, the speed limit fixed upon in the first instance is exceeded, the throw of the governor-balls becomes sufficient to cause one or the other of the said balls to strike the extension 41, whereupon the sleeve 39 is partially rotated and the lever 37 is released from the notch 38. At this point the braking action takes place, as already described, and the vehicle is brought down to a lower speed, the shock being relieved through the action of the spring 16. I may also provide a catch 42 on the shaft 28 for engaging with an extension 43 of a lever 44, pivoted at 45. This catch is so arranged as normally to hold the lever 44 out of the power of a spring 46, which tends to throw it in the direction of the arrow in Fig. 2. The lever 44 is connected by a link 47 with an arm 48, connected with a valve 49 in a pipe 50, connected with the motor 7, which is here assumed to be either a steam or a gas motor.

When the release of the lever 37 takes place, as described above, the catch 42 releases the lever 44 into the power of the spring 46, whereupon the lever 44 is operated to shut off the power from the motor 7, thereby cutting off the motive power from the vehicle.

The devices last described may or may not be superadded to the braking devices described in the earlier part of the specification. If the motor instead of being a gas or steam motor should be a motor of the electric type, the action of the catch 42 or its equivalent might simply be utilized to break the circuit of the motor in a manner readily understood.

I claim as my invention—

1. In mechanism of the character described, the combination with a driven shaft, and a governor actuated thereby, of a motor, a spring-impelled rotatable shaft, means normally acting to hold the latter-named shaft against rotation, means actuated by the governor for releasing the said holding means to permit the spring-impelled shaft to rotate, and means operated by said spring-impelled shaft for controlling the supply of motive energy to the motor.

2. In mechanism of the character described, the combination with a driven shaft, and a governor actuated thereby, of a motor, a spring-impelled rotatable shaft, a lever pivoted to said latter-named shaft, means controlled by the governor for holding and releasing said lever to control the rotation of the spring-impelled shaft, and means actuated by the rotation of the latter-named shaft for controlling the supply of motive energy to the motor.

3. In mechanism of the character described, the combination with a driven shaft and a governor actuated thereby, of a motor, a spring-impelled rotatable shaft, means normally acting to hold the latter-named shaft against rotation, means actuated by the governor for releasing the said holding means to permit the spring-impelled shaft to rotate, a valve for controlling the supply of motive fluid to the motor, and means operated by the said spring-impelled shaft for actuating the said valve.

4. In mechanism of the character described, the combination with a driven shaft and a governor operated thereby, of a motor, a spring-impelled shaft provided with a projecting catch, means normally acting to hold said shaft against rotation, means actuated by the governor for releasing said holding means to permit the spring-impelled shaft to rotate, a valve for controlling the supply of motive fluid to the motor, and a pivoted lever having a connection at one end with the valve and having its other end lying in the path of movement of the catch on the spring-impelled shaft, for the purpose specified.

5. In mechanism of the character described, the combination with a driven shaft, of a brake-wheel and a governor on said shaft, pivoted brake-shoes adapted to be brought into contact with opposite sides of the rim of said brake-wheel, restraining means normally acting to hold said brake-shoes out of contact with the brake-wheel, and means actuated by the governor for releasing said restraining means to permit the brake-shoes to act when the driven shaft exceeds a predetermined rate of speed.

6. In mechanism of the character described, the combination with a driven shaft, of a brake-wheel and a governor, on said shaft, a brake-shoe pivoted on each side of the brake-wheel and normally held out of contact therewith, each brake-shoe having a rearwardly-extending arm, a spring-impelled rotary cam embraced by said arms, means normally acting to hold said cam against rotation, and means actuated by the governor for releasing said cam-holding means to permit the cam to rotate whereby the brake-shoes will be brought into contact with the brake-wheel when the driven shaft exceeds a predetermined rate of speed.

7. In mechanism of the character described, the combination with a driven shaft, of a brake-wheel and a governor on said shaft, a pair of pivoted brake-shoes adapted to be brought into contact with opposite sides of the brake-wheel, but normally held out of contact therewith, each brake-shoe having a rearwardly-extending arm, a spring-impelled rotatable shaft, a cam on said shaft embraced by said rearwardly-extending arms, means normally acting to hold said shaft and its cam against rotation, and means actuated by the governor for releasing said shaft-holding means to permit the cam to rotate, whereby the brake-shoes will be brought into contact with the brake-wheel when the driven shaft exceeds a certain predetermined rate of speed.

8. In mechanism of the character described, the combination with a driven shaft, of a brake-wheel and a governor on said shaft, a pair of pivoted brake-shoes adapted to be brought into contact with opposite sides of the brake-wheel, but normally held out of contact therewith, each brake-shoe having a rearwardly-extending arm, a spring-impelled rotatable shaft, a cam on said shaft embraced by said rearwardly-extending arms, an arm on said spring-impelled shaft, means engaging said last-named arm to normally hold the spring-impelled shaft and its cam against rotation, and means actuated by the governor for releasing said arm-engaging means to permit the spring-impelled shaft with its cam to rotate, whereby the brake-shoes will be forced into contact with the brake-wheel when the driven shaft exceeds a certain predetermined rate of speed.

9. In mechanism of the character described, the combination with a driven shaft, of a brake-wheel and a governor on said shaft, a brake device adapted to be brought into contact with said brake-wheel, but normally held from contact therewith, a spring-impelled rotary shaft carrying a cam adapted to actuate said brake device, a pivoted arm on said rotary shaft, a rotatable sleeve having a seat therein to receive said pivoted arm and hold the latter against lateral movement and the rotary shaft against rotation, and means actuated by the governor for rotating the sleeve to free the pivoted arm from its seat whereby the spring-impelled shaft will be free to rotate and cause the cam to actuate the brake device.

Signed at New York, in the county of New York and State of New York, this 3d day of August, A. D. 1903.

DAVID MASON.

Witnesses:
   Wm. H. Capel,
   George H. Stockbridge.